United States Patent [19]
Baker et al.

[11] Patent Number: 5,958,488
[45] Date of Patent: Sep. 28, 1999

[54] PROCESS FOR PREPARING SHELF STABLE PASTA

[75] Inventors: Janice Margaret Baker; Gene Frank Clyde, both of New Milford, Conn.

[73] Assignee: Nestec S.A., Vevey, Switzerland

[21] Appl. No.: 08/846,201

[22] Filed: Apr. 25, 1997

[51] Int. Cl.$^6$ ............................. A23L 1/16; A23L 3/358
[52] U.S. Cl. .................. 426/289; 426/557; 426/324; 426/321
[58] Field of Search .................... 426/557, 289, 426/324, 296, 94, 321, 326

[56] References Cited

U.S. PATENT DOCUMENTS

| | | | |
|---|---|---|---|
| 3,655,401 | 4/1972 | Halik | 426/557 |
| 4,529,609 | 7/1985 | Gaehring et al. | 426/557 |
| 4,552,772 | 11/1985 | Saitoh et al. | 426/557 |
| 4,659,576 | 4/1987 | Dahle et al. | 426/324 |
| 5,332,587 | 7/1994 | Howard et al. | 426/557 |
| 5,436,015 | 7/1995 | Patterson | 426/557 |
| 5,695,801 | 12/1997 | Oh | 426/557 |
| 5,738,896 | 4/1998 | Cassetta et al. | 426/289 |

FOREIGN PATENT DOCUMENTS 51-29259  3/1976  Japan ..................... 426/557

*Primary Examiner*—Steven Weinstein
*Attorney, Agent, or Firm*—Pennie & Edmonds LLP

[57] ABSTRACT

A process of preparing a shelf stable pasta having a moisture content of from about 15 to about 35% which comprises preparing a fresh pasta, steaming the fresh pasta, partially drying to a moisture content of from about 15 to about 35%, coating the partially dried pasta with a solid humectant in particulate form before or after placing in a package, and packaging the pasta in a container optionally under modified atmospheric conditions.

15 Claims, No Drawings

PROCESS FOR PREPARING SHELF STABLE PASTA

FIELD OF THE INVENTION

The present invention relates to the production of a reduced moisture pasta, more particularly to the production of a quick cooking shelf stable reduced moisture pasta.

BACKGROUND OF THE INVENTION

Conventional quick cooking pastas are produced by preparing pastas either in precooked, high moisture form (containing 55–70% moisture) or in dehydrated form (containing 5–12% moisture) with a thin or expanded structure for quicker rehydration in boiling water. The precooked, high moisture pasta has a poor shelf-life stability which is usually overcome by acidification and in-package pasteurisation, while the dehydrated pasta has unsatisfactory textural quality.

Regular semi-moist pasta has a moisture content of about 15–45% and it has the advantage over dehydrated pasta that it requires only about half the cooking time even though the difference in moisture content is not great. The longer cooking time of the dehydrated pasta is because of the hardening of the pasta surface of the dehydrated pasta during the drying step. In addition, semi-moist pasta has the advantage over high moisture pasta in that it is easier to preserve. Because of these two advantages, semi-moist pasta can be a convenient quick cooking product provided it has an extended shelf life.

The addition of salt and other humectants to the dough mix to preserve semi-moist pasta products has been described in the prior art. For example, U.S. Pat. No. 4,529,609 describes a method of preserving a semi-moist pasta by dispersing a finely divided salt throughout a dough, partially gelatinizing the salt-containing dough, then drying the gelatinized dough to a moisture content of at least 15% and a maximum water activity of 0.85. U.S. Pat. No. 5,573,796 describes a method of producing a fresh pasta product (30–32% moisture) with an extended shelf life by incorporating up to 4% salt in the dough. Although adding salt to the dough is effective in preserving the pasta, it has the disadvantages of imparting a salty taste, and impairing the pasta texture.

The coating of salt and other humectants on the dough surface has been described, for example, in EP-A-0626137 which describes a method of preserving a shelf-stable, uncooked or partially cooked, acidified, moist pasta (15–38% moisture, pH below 4.6) by subjecting fresh pasta to steam treatment followed by immersing it in an acidulant and/or a humectant such as sodium chloride, propylene glycol or glycerol or mixtures thereof, partially drying the pasta, sealing the pasta in a container and pasteurising. JP-A-5123122 describes a method of producing steamed or boiled noodles of controlled acidity by soaking boiled or steamed noodles in aqueous solution containing organic acid, common salt and milk serum. The surface coating of acid on pasta gives the advantages of producing a pasta with a less salty taste (salt is rinsed away during the water heating step for consumption) and a better texture than the pasta made from dough to which salt has been added. However, the disadvantages are the production of an acidified pasta and the difficulty of drying spaghetti, linguine type longitudinal type products to a low moisture content of about 15% while maintaining an individual strand pasta shape without the strands tangling and sticking together after the pasta has been dipped in acid, salt, or other humectant solution and dried.

We have found that by coating the surface of the pasta with a solid humectant such as sodium chloride after the partial drying step, a reduced moisture pasta is produced with a better texture than a pasta not only where the humectant has been added to the dough but also where the humectant has been added to the pasta surface before partial drying. In addition, in-pack pasteurisation is unnecessary.

SUMMARY OF THE INVENTION

According to the present invention there is provided a process of preparing a shelf stable pasta having a moisture content of from about 15 to about 35% which comprises preparing a fresh pasta, steaming the fresh pasta, partially drying to a moisture content of from about 15 to about 35%, coating the partially dried pasta with a solid humectant in particulate form before or after placing in a package, and packaging the pasta in a container.

DETAILED DESCRIPTION OF THE INVENTION

The pasta ingredients of the dough for preparing the fresh pasta may include a dry farinaceous ingredient and water, with or without one or more additives, to form a dough. The farinaceous ingredient may be one or more of durum semolina, rice flour, buckwheat flour, durum flour, regular wheat flour, whole wheat flour, farine flour, corn flour or starch material, or any mixture thereof depending on the type of pasta product desired. Generally, durum semolina is preferred for extruded pasta, such as spaghetti, macaroni, etc., while durum or wheat flour are preferred for sheeted pasta, such as noodles. The farinaceous ingredient is usually present in an amount of from 75 to 85% of the dry ingredient mixture depending on the variety and particle size. The amount of water mixed with the farinaceous ingredient is normally from 15 to 35% by weight based on the total weight of the dough. The temperature of the water mixed with the farinaceous ingredient may be from 5° to 30° C. and more usually from 10° to 25° C. The water used may be acid or alkaline and the pH is usually from 6 to 7.

Wheat gluten is typically included in the dry ingredient mix at a level of about 2 to 20% by weight of the dry mix, with amounts between 5% and 10% being preferred, to increase the protein content of the pasta thereby increasing its strength and firmness. Dehydrated egg material such as dried egg white, dried eggs and dried yolks, for instance in the powder form, and/or liquid whole eggs, may if desired, be included in the ingredient mix at levels up to about 5.5% by weight for dry products and up to about 22% by weight for liquid products, based on the weight of the dry ingredient mix. Whole eggs and egg yolks generally are used in the production of noodles, while dried egg whites are generally used in the production of spaghetti. In addition, glyceryl monostearate may, if desired, also be included in the ingredient mix, particularly in the production of extruded pasta, to improve firmness, reduce stickiness and minimize absorption of water from the sauce component by the pasta. If used, the glyceryl monostearate preferably is present in amounts of from 0.5 to 2% by weight of the dry ingredient mix. It is to be understood that wheat gluten, eggs, and glyceryl monostearate are optional ingredients in the dry mix and are not essential in the production of the pasta component. It is also advantageous to use propylene glycol alginate in the dry ingredient mix to obtain a pasta with an elastic and firm texture, preferably in an amount of from 0.01 to 1.0% by weight based on the weight of the dry ingredient mix.

If desired, seasonings, spices or flavourings such as meat, chicken or beef flavours may be added to the pasta dough, e.g. in amounts of from 0.1 to 5% by weight based on the total weight of the pasta.

The dough may be formed into the fresh pasta under pressure by conventional methods such as sheeting, kneading or extrusion into a variety of pasta sizes and shapes, e.g. ravioli, spaghetti, macaroni, noodles and the like.

The fresh pasta which is steamed may be a sheeted pasta, a sheeted/slitted pasta, or an extruded pasta all of which may have been cut to the desired size.

The steaming of the fresh pasta may be carried out using saturated steam or steam at atmospheric condition, e.g. at a temperature from 85° to 100° C. and conveniently from 95° to 100° C. for a period of from 1 to 5 minutes, preferably from 1.5 to 3.5 minutes. The steaming cooks or gelatinises at least part of the surface of the pasta, e.g. at least 50% and preferably substantially all the surface of the pasta.

The fresh steamed pasta may be advantageously a sheeted dough which may be used to prepare longitudinal type pastas such as fettucine, linguine or spaghetti by partial drying followed by slitting and cutting and coated with the humectant before or after slitting or cutting or within the package before sealing. Alternatively, the fresh steamed pasta may be an extruded dough having the shape of the desired product, e.g. rotini or elbow macaroni, which is partially dried and then coated with the solid humectant either before packaging or within the package before sealing.

The partial drying of the pasta may be performed by means of an impingement, forced air drier, an oven tunnel or a hot air tunnel, e.g. at a temperature of from 80° to 110° C. over a period of from 1 to 10 minutes, more usually from 2 to 7.5 minutes.

In another embodiment of the present invention, the solid humectant is added to the package in which the pasta is sealed. In this case, direct contact of the solid humectant with the pasta is not necessary.

The solid humectant may be, for instance potassium chloride but is preferably sodium chloride. The solid humectant is preferably used in a finely ground form such as a flour or powder having a particle size up to 500 microns, preferably from 10 to 200 microns. The amount of humectant used may be from 0.5 to 10%, preferably from 1 to 7.5% and especially from 2 to 6% by weight based on the weight of the pasta. More or less humectant may be used as desired. The water activity of the pasta is preferably below 0.88, for instance from 0.6 to 0.85. For example, the water activity may be decreased from 0.92–0.93 to 0.86–0.87 with the addition of 2.5% sodium chloride and from 0.92–0.93 to 0.80–0.81 with the addition of 5% sodium chloride.

The pastas are packaged in suitable containers, e.g. food-grade flexible plastics pouches or glass jars. The packaging of the pasta in the container may, if desired, be carried out under modified atmospheric conditions and is preferably carried out at ambient temperature. The modified atmosphere may comprise nitrogen or carbon dioxide alone or a mixture of nitrogen and carbon dioxide as is conventionally used, e.g. a ratio of $N_2$ to $CO_2$ of 80:20, 65:35 or 50:50. Afterwards the package is sealed. Water activity equilibration takes place after the package has been sealed, and usually it takes from 24 to 48 hours to decrease to the desired level.

The shelf stable pastas of this invention require no acidification nor in-pack pasteurisation. The absence of acidification gives a pasta having a pH of from 6 to 10 and enables the longitudinal type pastas such as fettucini, spaghetti and linguine to maintain their individual strand pasta shape without tangling and sticking together. The pastas have an excellent texture and taste as well as being of quick-cooking quality. If desired, the pastas may be refrigerated. They may have a shelf life of from 6 months to a year or longer.

EXAMPLES

The following Examples further illustrate the present invention. Parts and percentages are expressed by weight.

Example 1

A dough is prepared by mixing 74.66 parts soft wheat flour, 1.49 parts whole egg powder, 1.31 parts salt, 0.09 parts sodium carbonate, 0.05 parts potassium carbonate and 22.40 parts water. The dough is then sheeted to 1 mm thickness and steamed at 93° C. for 3 minutes in saturated steam. The dough sheet is then surface dried in an impingement, forced air drier at 104° C. for 4 minutes and 30 hertz air velocity. 5 parts of flour salt (finely ground sodium chloride) is then dusted onto the surface of the surface dried pasta such that the salt substantially contacts all the sides of the pasta to coat the pasta, the coated pasta is slitted and cut to 2 mm width and 15 cm long, packaged with nitrogen and the package sealed. The water activity decreased from 0.92–0.93 to 0.80–0.81 during storage in the package.

Example 2

By following a similar procedure to that described in Example 1, but dusting with the flour salt after slitting, similar results are obtained.

Example 3

By following a similar procedure to that described in Example 1, but dusting with the flour salt after packaging, similar results are obtained.

We claim:

1. A process of preparing a shelf stable pasta having a moisture content of from about 15 to about 35% which comprises preparing a fresh pasta, steaming the fresh pasta sufficient to cook or gelatinize at least part of the surface of the fresh pasta, partially drying the steamed pasta to a moisture content of from about 15 to about 35%, and then either coating the partially dried pasta with a solid humectant in particulate form and packaging the coated partially dried pasta in a container or packaging the partially dried pasta in the container and coating the partially dried pasta in the container with a solid humectant in particulate form.

2. A process according to claim 1 wherein the fresh pasta which is steamed is either a sheeted pasta, a sheeted/slitted pasta, or an extruded pasta all of which have been cut to the desired size.

3. A process according to claim 1 wherein the steaming of the fresh pasta is carried out using saturated steam or steam at atmospheric condition for a period of from 1 to 5 minutes.

4. A process according to claim 1 wherein the fresh steamed pasta is a sheeted dough which after said partial drying is slit or cut to form longitudinal pasta and wherein said coating occurs either before or after slitting or cutting or in the container.

5. A process according to claim 4 wherein the partially dried pasta is packaged under modified atmospheric conditions.

6. A process according to claim 5 wherein the modified atmosphere comprises nitrogen or carbon dioxide alone or a mixture of nitrogen and carbon dioxide.

7. A process according to claim 1 wherein the fresh steamed pasta is an extruded dough having the shape of the desired product which is partially dried and then coated with the solid humectant, either before packaging or within the package before sealing.

8. A process according to claim 1 wherein the partial drying of the pasta is performed by means of either an impingement, forced air drier, an oven tunnel or a hot air tunnel at a temperature of from 80° to 110° C. over a period of from 1 to 10 minutes.

9. A process according to claim 1 wherein the solid humectant is sodium chloride.

10. A process according to claim 1 wherein the solid humectant is used in a finely ground form having a particle size up to 500 microns.

11. A process according to claim 1 wherein the amount of solid humectant used is from 0.5 to 10% by weight based on the weight of the pasta.

12. A process according to claim 1 wherein the water activity of the shelf stable pasta is below 0.88.

13. A process according to claim 1 wherein the pasta is packaged in food-grade flexible plastics pouches or glass jars.

14. A process according to claim 1 wherein the packaging of the pasta in the container is carried out under modified atmospheric conditions.

15. A process according to claim 14 wherein the modified atmosphere comprises nitrogen or carbon dioxide alone or a mixture of nitrogen and carbon dioxide.

* * * * *